United States Patent Office 3,418,159
Patented Dec. 24, 1968

3,418,159
METHOD FOR FIRE-PROOFING WOOD
Christen Christoffersen and Karl-Otto Sörensen, Nestved, Denmark, assignors to Vedex Dansk Skovindustri A/S, Nestved, Denmark, a company of Denmark
No Drawing. Filed Mar. 29, 1965, Ser. No. 443,643
Claims priority, application Denmark, June 15, 1964, 3,000/64
1 Claim. (Cl. 117—137)

ABSTRACT OF THE DISCLOSURE

A method for fire-proofing wood by impregnating the same with an agent containing an ammonium salt and a polyethylene glycol of a molecular weight of between 600 and 2000. The ratio by weight between the ammonium salt and the polyethylene glycol in the impregnating agent is between 10:1 and 4:5. Having such a composition, the impregnating agent is prevented from being washed away so that the impregnated material is maintained fire-proof.

---

This invention relates to a method of increasing the resistance of wood against influences from the outside.

It is known that the resistance of wood and timber against influences from the outside, such as resistance to fire and resistance against fungus attack can be increased by impregnating the materials with an impregnating agent containing monoammonium phosphate, diammonium phosphate, ammonium sulphate or similar ammonium salts which can stand heating. However, it is known that such salts can fairly easily be washed out of the wood, for example, beams or boards. This is true not only under circumstances where the water comes into direct contact with the wood as a liquid, for example, rain, but also under circumstances of exposure to moist conditions and water vapor in the atmosphere. Under the latter conditions the washing away of the impregnated material will occur even though it takes a long time.

It is also known that it is possible, to impregnate veneer pieces with diammonium phosphate and bind, by pressure and heat, said veneer pieces together using an adhesive comprising a synthetic resin together with kaolin and diammonium phosphate, to produce boards, panels or the like articles. Thus produced, such items have particularly high fire resisting properties. However, parts of the diammonium phosphate will be washed out of such items. Owing to the pores of the veneers being substantially completely filled with the impregnating agent, and the applied adhesive having a synthetic resin base, water and other liquids are prevented from penetrating the veneer the diammonium phosphate is washed away only from the outermost veneer layers and from the edges of such item. Therefore, this approach only slightly reduces the fire resisting properties of the item, but nonetheless causes the surfaces of the board to be susceptible to fire for a time.

The principal object of the present invention is to provide a method for increasing the resistance of wood against outside influences, particularly fire, by impregnating the same with an impregnating agent containing diammonium phosphate, monoammonium phosphate, ammonium sulphate or similar ammonium salts. The method, according to the invention, protects ammonium salts from being washed away, even if the material is later on exposed to rather heavy moisture or comes into direct contact with water. We have found that this can be achieved by using an impregnating agent which, in addition to the ammonium salt, contains a polyethylene glycol of a molecular weight of between 600 and 2000 and is in such quantity that the ratio by weight between the ammonium salt and the polyethylene glycol in the impregnating agent is between 10:1 and 4:5.

It has been found that when such an impregnating agent is used to impregnate wood, the polyethylene glycol will, probably because it encloses the single ammonium salt particles, prevent the ammonium salts from being washed away so that the impregnated material maintains its resistance to fire, as well, as other properties obtained by the impregnation. It is believed that this phenomenon results from single ammonium salt particles being enclosed by the polyethylene glycol.

Boards, beams and other similar forms of wood, which have been impregnated by the new method have their fire-resisting properties greatly improved. For example, an impregnation with diammonium phosphate, which was earlier of no practical consequence due to the relatively short life of such an impregnation, now assumes practical importance. The wood upon being impregnated, irrespective of the environment where it is stored retains its fire-resisting property. Although the wood, thus treated, may not be prevented from burning in the event of a fire, nevertheless, it will, to a certain degree, cause delay in the spreading of the fire.

With regard to the above-mentioned fire-resisting veneer boards, when such boards are treated according to the method of the invention, their fire-resistance properties are greatly improved and are maintained even if such boards are from time to time exposed to direct influence from water. The diammonium phosphate cannot be washed away, and even the most exposed surface layers will retain their full fire resistance and thus the boards will not only be secure against being burned through, but also against the flames being able to run along their surface.

Example 1

Two sets each of 25 veneer plates, each 1 mm. thick, were dried in a drying oven until they had a moisture content of about 5%, whereafter each set of veneers was placed in one of two separate vacuum tanks from which substantially all of the air was pumped. Thereafter one tank was filled with a 30% aqueous solution of diammonium phosphate. The other tank was filled with a 40% aqueous solution of a mixture of 60% diammonium phosphate and 40% polyethylene glycol having a molecular weight of 1500 into the other tank. After a short time the tanks were drained and opened, and the veneers were taken out and again placed in the drying oven where they were dried until a moisture content of about 6–10% was achieved.

From the two sets of veneer, two boards were produced. For this purpose an adhesive was prepared by mixing 100 parts by weight of phenol formaldehyde, 10 parts of paraformaldehyde, 5 parts of diammonium phosphate, 50 parts of kaolin and 75–100 parts of water.

The 25 veneers of each set were piled on top of each other, and the adhesive, thus prepared, was applied to both sides of every second veneer until a 0.2 mm.-thick layer of said adhesive was deposited thereon. The veneer pile was next introduced into a press. The latter was heated to about 130° C. and applied to the veneer pile with a pressure of about 100 kg./cm.$^2$. The effect of such pressure was not only that the veneers were pressed closely together but that the individual veneers of each pile were compressed to such a degree that the thickness of each decreased up to 30%. Each veneer pile was held under these conditions in the press for a period of 16–20 minutes, and the result was two plywood boards each of a thickness of 25 mm.

Each board was divided into halves, and one half of each board was subjected to a fire test by being exposed to the flame from a butane gas pressure burner directed perpendicularly to the half board surface. Only after a continuous application of flame through a period of more than 150 min. did both board halves begin to show the start of charring on the rear side. The board halves were, however, even at this time fully intact without showing any peelings and only a slight insignificant bulging. Even on the side directly influenced by the flame, the charred parts were distinctly limited to zones directly under the influence of the flame, and the charring had taken place without any essential development of smoke.

The two other halves of the two boards were placed for a week in running water whereafter they were dried and exposed to the same fire test as mentioned above.

The board half which was cut from the board containing veneers impregnated with a mixture of diammonium phosphate and polyethylene glycol behaved at the fire test in exactly the same manner as the board halves not treated with water. On the other hand, the fire test of the board-half containing veneers only impregnated with diammonium phosphate resulted in flames running across the board-half above the burner causing the outer side of the board-half to be slightly charred shortly after the board was first exposed to the flame. This spreading of the flames only lasted for about half a minute and then stopped.

A start of charring on the rear side of the board was not observed until after a period of more than 150 minutes had expired. The appearance of the board-half after the test corresponded to the appearance of the corresponding board-half which had not been treated with water in all respects, except that slight charring occurred on the side which had faced the flame and the transition area between the zone directly influenced by the flame and the surrounding board showed a zone of irregular charring. Half a millimeter of the board around the charred zone was now scraped off, and the board surface uncovered showed the same sharp transition between the charred zone and the not burned board part as was the case for the corresponding board part not treated with water.

Such running of the flame along the board surface and the slight charring of the front side of the board had, however, been completely avoided on the board, which had veneers impregnated with a mixture of diammonium phosphate and polyethylene glycol.

Example 2

A 3 x 3 cm. thick deal beam was divided into five pieces. Four of the pieces were dried and placed, two at a time, into a vacuum tank. After the first two pieces were placed into the vacuum tank, the tank was evacuated in preparation for impregnation. A 30% aqueous solution of ammonium sulphate was introduced into the tank for impregnation of the first two pieces therein. After impregnation of the first two pieces, a 40% aqueous solution of a mixture of two parts of ammonium sulphate and one part of polyethylene glycol having a molecular weight of 1000 was introduced into the tank for the impregnation of the other two pieces. After impregnation of the last two pieces the four impregnated pieces of the beam were then together with the fifth piece of the beam dried in a drying oven.

Three days after the drying, during which time the beam pieces were covered and stored in the open air, one of the pieces only impregnated with ammonium sulphate and one of the pieces impregnated with a mixture of ammonium sulphate and polyethylene glycol were submerged in water for five hours after which time they were dried in an oven. Together with the remaining three pieces they were next kept for two more days in the open air, but covered up.

Each of the five beam pieces were next placed above a Bunsen burner. Each of the five Bunsen burners had a flame the height of which was the same as that of the others.

After 3–4 minutes the non-impregnated piece of beam caught fire, and after 5–6 minutes the ammonium sulphate impregnated and later washed out piece of beam also caught fire. The three remaining beam pieces, namely the piece that was impregnated with ammonium sulphate only, but not exposed to water, and the two pieces which were impregnated with a mixture of ammonium sulphate and polyethylene glycol, one of which had also been in a water bath caught fire but only in very slight degree. These three last beam pieces were charred only after 15–20 minutes and more or less at the same time.

The quantity ratio of the ammonium salt and the polyethylene glycol may be varied, according to the type of material to be impregnated and the purposes of its application, within rather wide limits. However, it has been found that the proportion between the quantity of ammonium salt and the quantity of polyethylene glycol should not be less than 4:5, as otherwise, the fire preventing quality of the ammonium salt is limited, nor should it exceed 10:1, as otherwise, the duration of the protection offered by the polyethylene glycol against the washing out of the ammonium salt will be curtailed.

Experiments have been made with different kinds of polyethylene glycol, and it has been found that all types of polyethylene glycol with a molecular weight of between 600 and 2000 may be used effectively with the method, according to the invention, to obtain the desired result of good fire proofing. By the use of polyethylene glycol with a molecular weight of above 2000, the article impregnated acquires an unpleasant greasy surface.

We claim:
1. In a method for making wood substantially fire-resistant, the steps comprising:
    (a) mixing together an ammonium salt, of the group consisting of monoammonium phosphate, diammonium phosphate and ammonium sulphate, and a polyethylene glycol having a molecular weight of between 600 and 2000, said ammonium salt and said polyethylene glycol being mixed together according to a ratio within the range of 4:5 and 10:1 to form a fire-resistant composition which is water-resistant and which, once impregnated in a wooden article, can not be washed away;
    (b) impregnating an article made of wood with the fire-resistant composition thus formed to make the article substantially fire-resistant.

References Cited

UNITED STATES PATENTS 1,827,263   10/1931   Roman _____ 252—8.1 X
2,347,031   4/1944   Cupery _____ 117—137 X WILLIAM D. MARTIN, *Primary Examiner.*

J. W. BORDERS, *Assistant Examiner.*

U.S. Cl. X.R.

117—148